United States Patent [19]
Keate et al.

[11] Patent Number: 5,953,636
[45] Date of Patent: Sep. 14, 1999

[54] SINGLE-CHIP DBS RECEIVER

[75] Inventors: Christopher Keate, Santa Clara; Daniel Luthi, San Jose, both of Calif.

[73] Assignee: LSI Logic Corporation, Milpitas, Calif.

[21] Appl. No.: 08/741,269

[22] Filed: Oct. 30, 1996

[51] Int. Cl.$^6$ ................................................. H04H 1/00
[52] U.S. Cl. .............................. 455/3.2; 348/10; 348/731
[58] Field of Search ............................. 375/316; 348/10, 348/11, 726, 731, 733; 455/3.2

[56] References Cited

U.S. PATENT DOCUMENTS

| | | | |
|---|---|---|---|
| 4,261,054 | 4/1981 | Scharla-Nielsen | 455/12 |
| 4,641,324 | 2/1987 | Karsh et al. | |
| 4,694,291 | 9/1987 | Denhez et al. | |
| 4,829,525 | 5/1989 | Sugiyama et al. | |
| 4,845,713 | 7/1989 | Zook | |
| 4,928,288 | 5/1990 | D'Aria et al. | |
| 5,051,998 | 9/1991 | Murai et al. | |
| 5,088,113 | 2/1992 | Wei | |
| 5,181,209 | 1/1993 | Hagenauer et al. | |
| 5,216,677 | 6/1993 | Tagaki et al. | |
| 5,276,904 | 1/1994 | Mutzig et al. | 455/3.2 |
| 5,390,195 | 2/1995 | Brush | |
| 5,420,640 | 5/1995 | Munich et al. | |
| 5,422,894 | 6/1995 | Abe et al. | |
| 5,430,743 | 7/1995 | Marturano et al. | |
| 5,457,704 | 10/1995 | Hoeher et al. | |
| 5,517,529 | 5/1996 | Stehlik | 375/316 |
| 5,519,734 | 5/1996 | Ben-Efraim | |
| 5,548,684 | 8/1996 | Wang et al. | |
| 5,640,670 | 6/1997 | Samueli et al. | 455/3.2 |
| 5,706,665 | 1/1998 | Luthi et al. | 371/5.1 |
| 5,708,665 | 1/1998 | Luthi et al. | |
| 5,710,783 | 1/1998 | Luthi et al. | |

FOREIGN PATENT DOCUMENTS

| | | |
|---|---|---|
| 0 501 829 A1 | 9/1992 | European Pat. Off. |
| 0 696 854 A1 | 2/1996 | European Pat. Off. |
| 0 716 518 A2 | 6/1996 | European Pat. Off. |
| 42 37 692 C1 | 3/1994 | Germany |
| 96/12352 | 4/1996 | WIPO |

OTHER PUBLICATIONS

Chien et al., Monolithic GPS Receiver and Synthesizer Using High–Speed Silicon Bipolar Technology, IEEE, pp. 64–67, Feb. 1992.

Koshelets et al, Integrated Sub–MM Wave Receivers, IEEE, pp. 3057–3060, Jun. 1995.

Hubbard et al, A Family of Low Cost High Performance HEMT MMICs for Commercial DBS Applications, IEEE, pp. 133–136, 1995.

Sklar, Bernard, *Digital Communications: Fundamentals and Applications*, 1988 by Prentice Hall, pp. 263–265.

Hagenauer, J., "Forward Error Correction Coding for Fading Compensation in Mobile Satellite Channels", IEEE Journal on Selected Areas in Communications, vol. SAC–5, No. 2, Feb. 1987, pp. 215–225.

Arazi, B, "A Commonsense Approach to the Theory of Error Correcting Codes", The MIT Press, 1988, p. 137.

(List continued on next page.)

*Primary Examiner*—Andrew I. Faile
*Assistant Examiner*—Uyen Le
*Attorney, Agent, or Firm*—Conley, Rose & Tayon, PC; B. Noel Kivlin

[57] ABSTRACT

The present invention concerns a DBS receiver which serves to combine the functions of variable rate demodulation, convolutional decoding, de-interleaving and block decoding. The demodulation stage includes a novel circuit for clock synchronization. By combining the functions of these components this device provides a higher level of utility as measured in terms of reliability, simplicity, flexibility, cost effectiveness, and integration of board layout while maintaining optimum-quality signal processing.

15 Claims, 4 Drawing Sheet

OTHER PUBLICATIONS

Deng, R., et al, "High Rate Concatenated Coding Systems Using Bandwidth Efficient Trellis Inner Codes" IEEE Transactions on Communications, vol. 37, No. 5, May 1989., pp. 420–426.

Deng, R., et al, "High Rate Concatenated Coding Systems Using Multidimensional Bandwidth–Efficient Trellis Inner Codes," IEEE Transactions on Communications, vol. 37, No. 10, Oct. 1989, pp. 1091–1095.

Hagenauer, J., et al, "A Viterbi Algorithm with Soft–Decision Outputs and its Applications," IEEE CH2682–3/89/ 0000–1680, pp. 1680–1686.

Oppenheim, et al, *Discrete–Time Signal Processing*, 1989 by Prentice Hall, pp. 444–448.

Whitaker, S. et al., "Reed Solomon VLSI Codec for Advanced Television", IEEE Transactions on Circuits and Systems for Video Technology, vol. 1, No. 2, Jun. 1991, pp. 230–236. s

SINGLE-CHIP DBS RECEIVER

BACKGROUND OF THE INVENTION

1. Field of the Invention

This invention relates to an apparatus for receiving and decoding a signal such as that transmitted according to the digital video broadcast standard ("Specifications of the Baseline Modulation/Channel Coding System for Digital Multi-Programme Television by Satellite", European Broadcasting Union, January 1994). Such signals are commonly used in satellite communications systems which employ error correction to combat signal corruption. More specifically, this invention concerns a device with a variable rate QPSK/BPSK demodulator and a concatenated Viterbi/Reed-Solomon decoder.

2. Description of the Relevant Art

Digital broadcast satellite (DEBS) communication systems provide reliable long range transmission of information without the need for a pre-existing network of transmission lines and routing switches. However, since the costs entailed in creating a satellite and placing it in orbit are literally astronomical, the economic practicality of these systems depends in large part on widespread use of DBS receiver systems. Consequently containment of the costs for construction, distribution and maintenance of DBS receiver systems plays an important role for the emerging DBS technology.

FIG. 1 shows a standard model for a communications system 124 comprising a discrete-time channel 126 interposed between an encoder 128, and a decoder 130. Discrete-time channel 126 includes a continuous-time channel 140 interposed between a modulator-demodulator pair 138, 142. In this case the continuous-time channel may take the form of the atmosphere through which a broadcast signal propagates. The modulator-demodulator pair will typically use binary or quadrature phase shift keying as the modulation technique. By grouping the continuous-time channel with the modulator-demodulator pair, it becomes possible to treat the whole as a discrete-time channel which accepts a digital input signal and produces a possibly corrupted version of the input signal. Due to the power restrictions placed on satellite transmission channels, the probability of signal corruption is substantial.

To make satellite communications feasible, error correction codes are used which permit transmitted information to be communicated reliably at high data rates. The error correction coding scheme advocated by the standard referenced above is a concatenated coding scheme as shown in FIG. 1. Encoder 128 is comprised of three subcomponents: an outer encoder 134, an interleaver 136, and an inner encoder 132. Outer encoder 134 is a block encoder, in this case a Reed-Solomon encoder. Inner encoder 132 is a convolutional encoder. The combination of block and convolutional encoding is known to increase the error correcting capability of the decoder, and the use of an interleaver/de-interleaver pair serves to provide the large coding gain necessary to feasibly operate the power-limited satellite communications channel. Consequently, a critical part of the DBS receiver systems is the error correction decoding device. Hence it would be advantageous to provide a reliable yet economical implementation of an error correction decoding device as part of a DBS receiver system.

SUMMARY OF THE INVENTION

The problems outlined above are in large part solved by a DBS receiver which serves to combine the functions of variable rate demodulation, convolutional decoding, de-interleaving and block decoding. In one embodiment, the DBS receiver comprises a tuner coupled to an analog-to-digital converter which in turn is coupled to a single-chip receiver. The single-chip receiver comprises a demodulation stage and two decoder stages. The demodulation stage includes a novel circuit for clock synchronization circuit. By combining the functions of these components and adding a novel feedback circuit for clock synchronization, this device provides a higher level of utility as measured in terms of reliability, simplicity, flexibility, cost effectiveness, and integration of board layout while maintaining optimum-quality signal processing.

Broadly speaking, the present invention contemplates a digital broadcast satellite (DBS) receiver system comprising a tuner, an analog to digital converter and a receiver chip. The receiver chip comprises a demodulator stage, a convolutional decoder stage, and a de-interleaver and block decoder stage. The tuner serves to receive a high frequency signal from the satellite dish and thereafter produce a baseband signal which is then converted to a digital signal by the analog to digital converter. The receiver chip completes the receiving process by demodulating and decoding the digital signal. In addition, the receiver chip provides feedback signals which may be used in negative feedback loops to control the gain, carrier, and clock acquisition and tracking.

BRIEF DESCRIPTION OF THE DRAWINGS

Other objects and advantages of the invention will become apparent upon reading the following detailed description and upon reference to the accompanying drawings in which.

Figure 1:
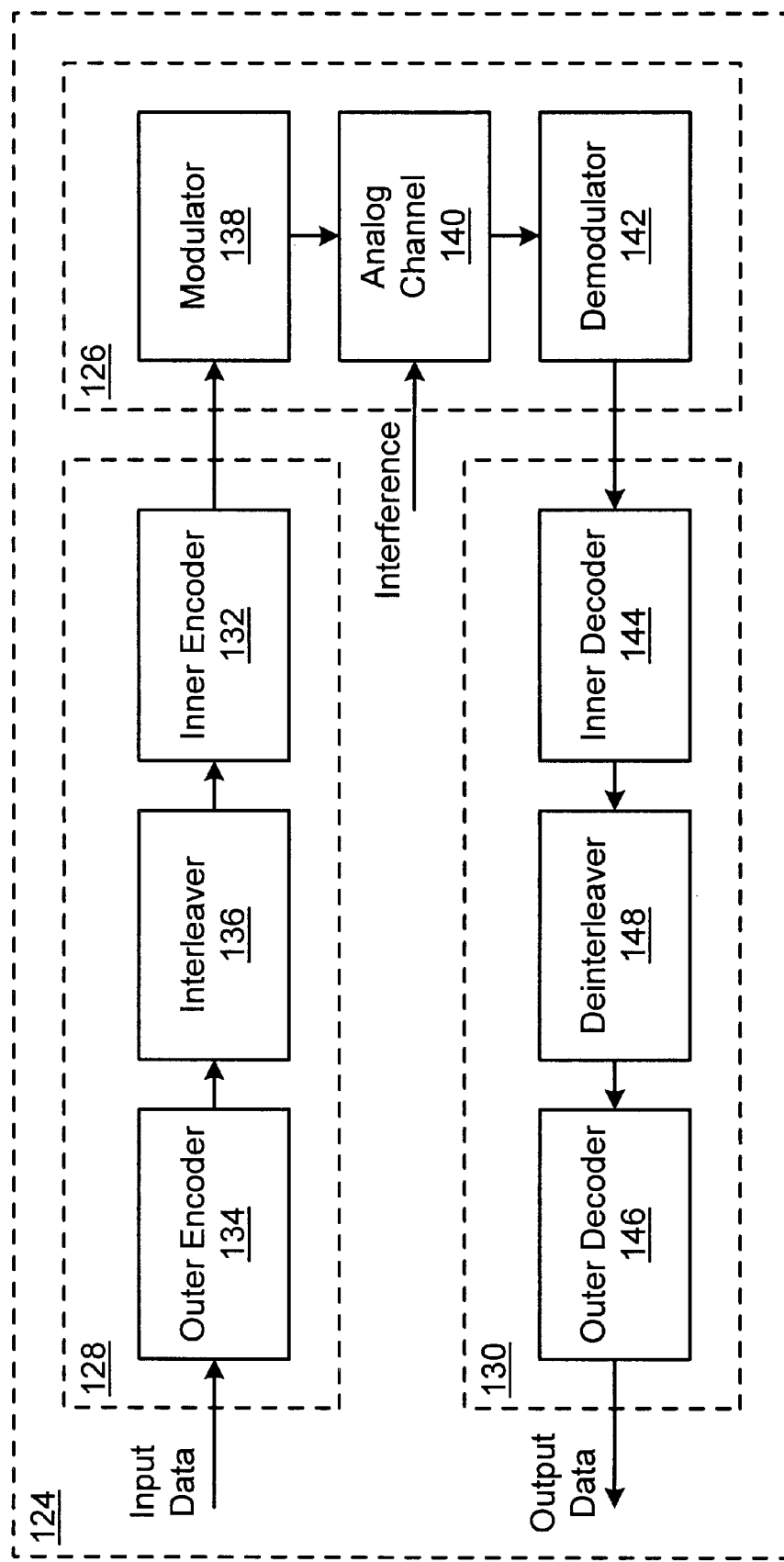
FIG. 1 is a block diagram of a digital communications system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
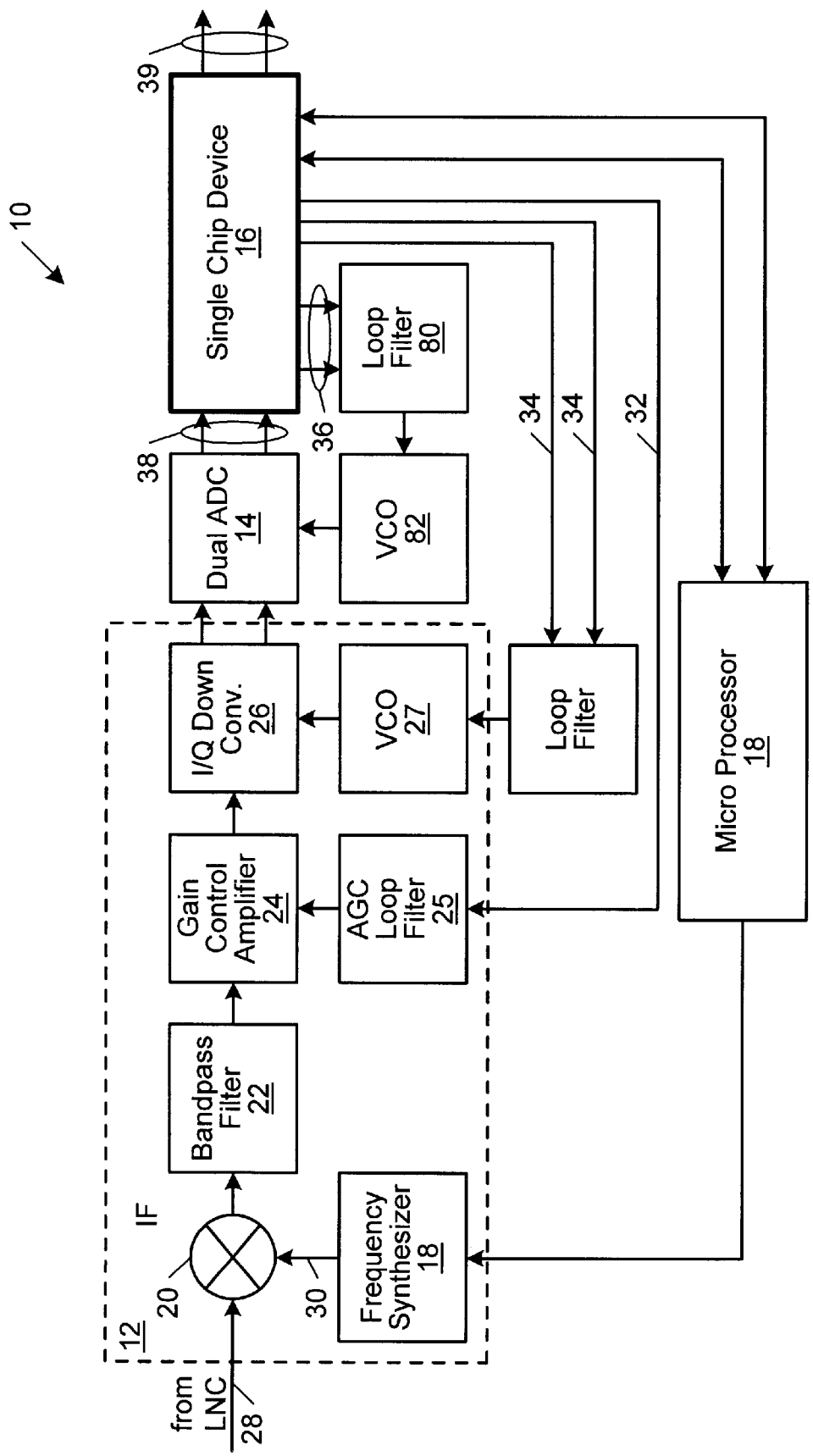
FIG. 2 is a block diagram of a DBS receiver system comprising a tuner, an analog to digital converter, and a receiver chip.

Turning now to the drawings, FIG. 2 shows a DBS receiver system 10 comprising a tuner 12, an analog to digital converter 14, a receiver chip 16, and microprocessor 18.

Tuner 12 comprises frequency synthesizer 18, analog multiplier 20, intermediate frequency bandpass filter 22, gain control amplifier 24, automatic gain control loop filter 25, I/Q down converter 26, and voltage controlled oscillator 27. Tuner 12 serves to convert a high frequency received signal to a baseband signal. Analog to digital converter 14 serves to convert the analog baseband signal to a digital signal. Receiver chip 16 serves to demodulate and decode the digital signal. The frequency synthesizer is set to be "tuned" to the high frequency received signal. This is accomplished by synthesizing an output signal 30 with a frequency which is offset by a fixed amount from the frequency of the desired received signal. The fixed amount will be the frequency of a product signal which is generated by multiplier 20.

Multiplier 20 multiplies high frequency signal 28 and output signal 30 from frequency synthesizer 18 to effectively shift the frequency of high frequency signal 28 to an intermediate frequency in an intermediate frequency signal. The product signal at the output of multiplier 20 can be expressed as the sum of a desired intermediate frequency signal and other undesired byproduct signals. The product signal is coupled to intermediate frequency bandpass filter 22 which removes the undesired frequency components (and in so doing, removes the undesired byproduct signals) leaving only the intermediate frequency signal.

Output of bandpass filter 22 is coupled to gain control amplifier 24 which regulates the amplitude of the intermediate frequency signal. Gain control amplifier 24 has an adaptive gain which is set to provide a constant amplitude output signal. The regulation mechanism is based on a negative feedback signal 32 provided by receiver chip 16. The effect of feedback signal 32 is to increase the gain of gain control amplifier 24 when the amplitude of the output signal declines below a target level, and to decrease the gain when the amplitude exceeds a target level.

Output of the gain control amplifier 24 is coupled to I/Q down converter 26 which converts the intermediate frequency signal to a baseband signal. The conversion may take place in a similar fashion to the previous frequency conversion, but in this case two baseband signals are needed to represent the in-phase (I) and quadrature-phase (Q) components of the intermediate frequency signal. After the I/Q down conversion process there is typically some residual oscillation due to a frequency offset error. However, I/Q down converter 26 regulates the offset error using negative feedback signal 34 provided by receiver chip 16. The effect of feedback signal 34 is to fine-tune the frequency of the local oscillator used in the down-conversion, thereby eliminating the residual oscillation.

Output of I/Q down converter 26 is coupled to analog to digital converter 14 which serves to convert the baseband signal to digital input signal 38. The rate at which the analog baseband signal is sampled is governed by a feedback signal 36. As will be explained in greater detail later, the feedback signal is initially set to provide a theoretically correct sampling frequency, and fine-tuned thereafter. The digital input signal 38 is then coupled to receiver chip 16.

Figure 3:
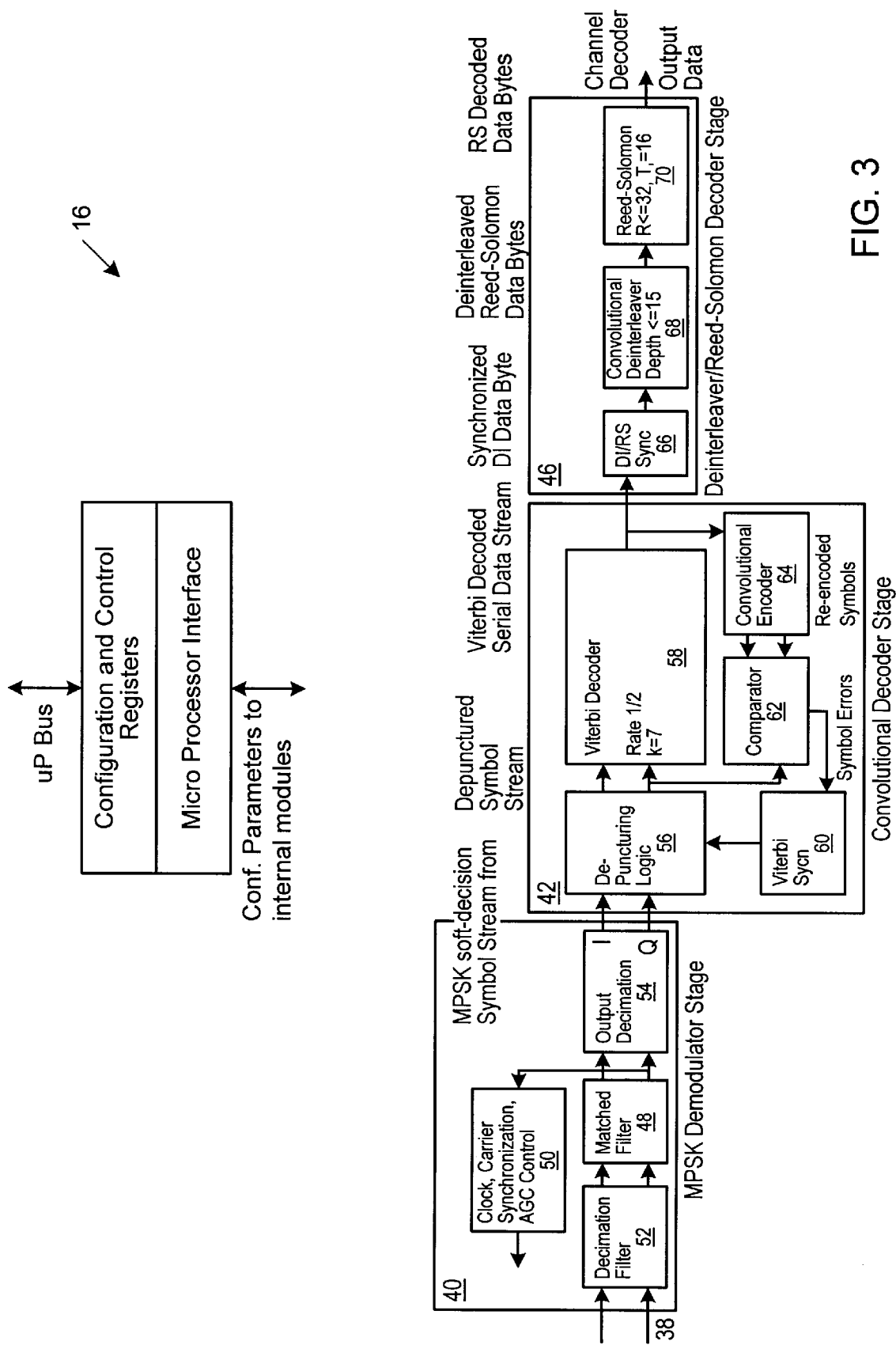
FIG. 3 is a block diagram of a receiver chip comprising a demodulator stage, a convolutional decoder stage, and a de-interleaver/block decoder stage.

FIG. 3 shows receiver chip 16 comprising a demodulator stage 40, a convolutional decoder stage 42, and a de-interleaver and block decoder stage 46. Demodulator stage 40 serves to provide filtering and symbol-rate sampling. Convolutional decoder stage 42 serves as the first decoding stage of the concatenated decoder. The final decoding stage is provided by de-interleaver and block decoder stage 46.

Demodulator stage 40 comprises a matched filter 48 and a module 50 for timing control and gain control. Matched filter 48 filters digital input signal 38 to substantially maximize the signal-to-noise ratio of the input signal. To accomplish this, the impulse response of the filter is designed to be the time-reverse of the shape of a symbol signal. Hence, the filter is "matched" to the signal. One common symbol shape is a square root raised cosine.

Output of matched filter 48 is coupled to module 50 which provides feedback signals for gain control 32, carrier synchronization 34, and clock synchronization 36. As mentioned before, the feedback signal for gain control is used to maintain a constant signal amplitude. The carrier synchronization feedback signal serves to fine-tune the local oscillator of the I/Q down converter to remove any residual oscillation. The clock synchronization feedback signal will be treated in greater detail below.

Demodulator stage 40 may additionally comprise a decimation filter 52 and an output decimator 54. Decimation filter 52 and output decimator 54 allow for oversampling by analog to digital converter 14. Oversampling is the practice of sampling an analog signal at a higher rate than the symbol rate. Use of this practice allows the transfer of some filtering operations from the analog domain to the digital domain. In general, only simple analog filters are practical. For complex filtering operations, digital filters are significantly easier to implement and adjust. By oversampling and performing the matched filter operation in the digital domain, a substantial implementation complexity reduction is achieved. Furthermore, the use of oversampling allows relaxed tolerances on the analog filters used in the analog-to-digital conversion process, without significant impairment to the signal-to-noise ratio. Demodulator stage 40 allows the rate of oversampling to be varied to accommodate differing data rates.

Prior to the decoding stage, the sampling rate of the signal must be made equal to the symbol rate. This is accomplished through a digital lowpass filtering operation provided by decimation filter 52, and output decimator 54 which passes on only one sample per symbol.

As shown in FIG. 3, convolutional decoder stage 42 comprises de-puncturing logic 56 and a Viterbi decoder 58. Viterbi decoder 58 is a decoder for a standard industry convolutional code, namely a rate ½, constraint-length 7 code with octal generators (133, 171). Several well-known puncturing methods are used to adapt this rate ½ code to a rate ⅔, ¾, or ⅚ code which can still be decoded by the Viterbi decoder for the rate ½ code. De-puncturing logic 56 performs the necessary adaptation on the receiving end.

Synchronization for input to Viterbi decoder 58 is provided by Viterbi synchronization circuit 60, which relies on an estimation of the symbol error rate which can be determined from the output of comparator 62. Comparator 62 determines the differences between the signal before decoding and a re-encoded version of the signal after decoding. Due to the error correcting capabilities of the Viterbi decoder, when only a few received symbol errors exist, the re-encoded signal should be relatively free of symbol errors. When the decoder is out of synchronization, the re-encoded signal will contain many symbol errors. Hence, the error rate determined by the comparator provides a good synchronization indicator. The output symbols from Viterbi decoder 58 are coupled to de-interleaving and block decoding stage 46.

De-interleaving and block decoding stage 46 comprises synchronization circuit 66, de-interleaver 68, and block decoder 70. Synchronization circuit 66 serves to locate the beginning of an interleaved code word block and forward data to de-interleaver 68 accordingly. De-interleaver 68 and block decoder 70 are implemented with parameters specified in the digital video broadcast standard referenced previously.

Synchronization circuit 66 functions by scanning the Viterbi decoder output symbols for the sync bytes of 0047 hex. These bytes mark the beginning of a new block, and the synchronizer aligns the data accordingly for the subsequent de-interleaver and decoder.

The output signal of synchronization circuit 66 is coupled to de-interleaver 68. De-interleaver 68 functions to disperse symbols which are adjacent in the output signal of synchronization circuit 66. The dispersion is the inverse of an interleave operation which was performed in the original encoding of the signal. One benefit of the dispersion is that it breaks up and isolates errors which are part of an error burst. This greatly benefits the performance of the block decoder.

Block decoder 70 performs the final error correction and decoding stage of the decoding process. A standard block code family used in these systems is the family of Reed-Solomon codes. Reed-Solomon codes provide a powerful error correction ability which permits reliable decoding of the transmitted information. The decoded information is then provided as output 39 from the DBS receiver system.

Figure 4:
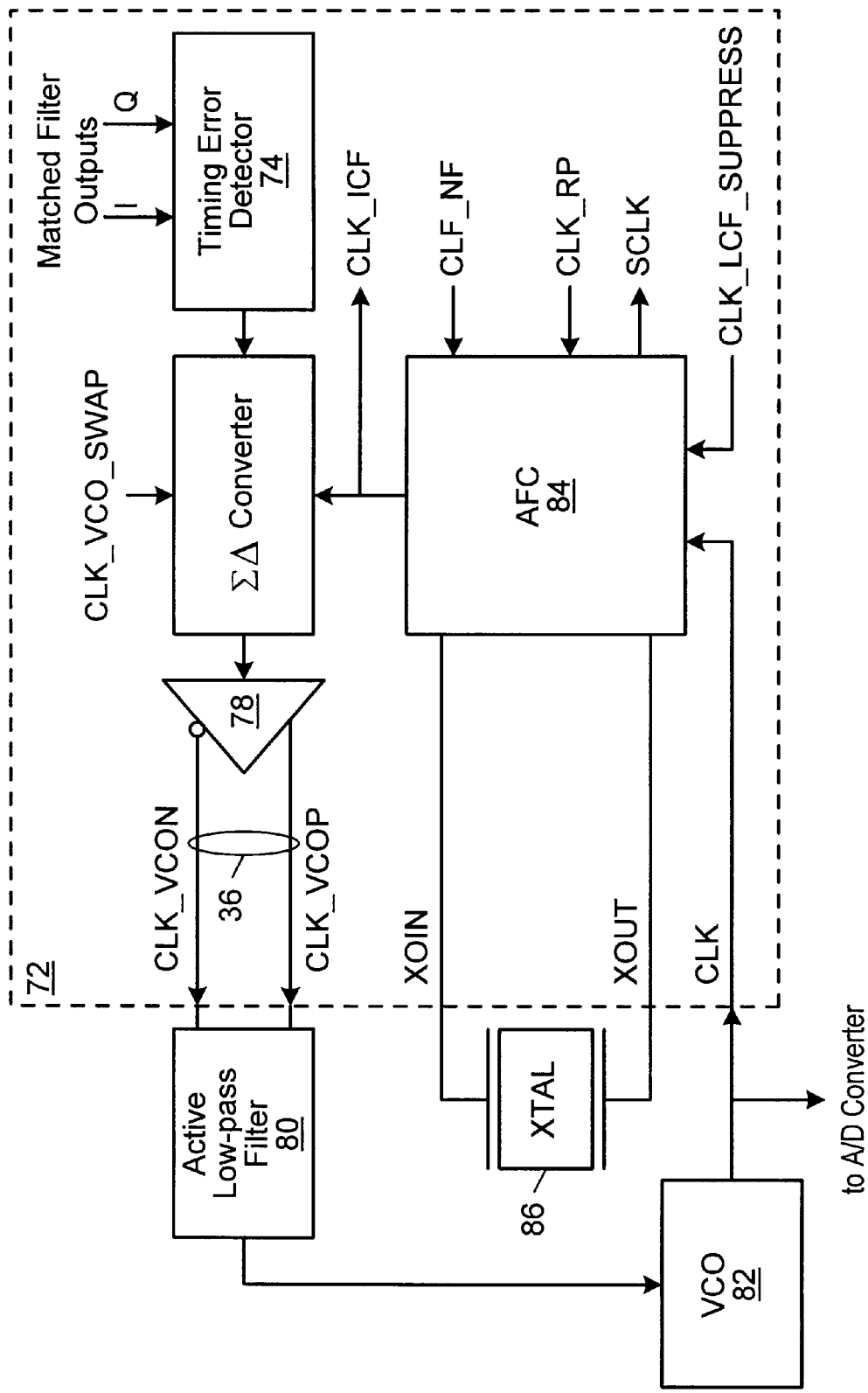
FIG. 4 is a block diagram of a module for providing a feedback signal from the receiver chip for clock acquisition and tracking.

FIG. 4 shows a block diagram of a subsystem of module 50 which provides feedback signal 36 for clock synchronization. The clock synchronization circuit 72 operates in one of two modes: acquisition and tracking. In tracking mode, timing error detector 74 measures characteristics of the signal output by matched filter 48 and provides a correction signal to accumulator 76 which provides a feedback signal representing a weighted sum of past correction signals. The feedback signal is buffered and amplified by amplifier 78. The feedback signal is then filtered by an off-chip, user configurable filter 80 and coupled to voltage controlled oscillator 82 as shown. Voltage controlled oscillator 82 is used to provide the clock for analog to digital converter 14, thereby closing the phase-locked loop.

A well-known property of phase-locked loops is inordinate non-linearity. For correct operation, phase-locked loops must first be placed in an initial state closely approximating the correct operating point. In the acquisition mode automatic frequency controller 84 serves this function.

Automatic frequency controller 84 uses a counter and a timer comprised of a second counter and a crystal oscillator 86 to determine the output frequency of voltage controlled oscillator 82. Using a configurable parameter as a timer interval, automatic frequency controller loads the second counter and decrements it for every clock cycle of crystal oscillator 86 until the counter reaches zero. At the same time the second counter is loaded, the first counter is also loaded with the desired number of oscillations of voltage controlled oscillator 82 in the timer interval. During the timer interval, the first counter is decremented for every oscillation of voltage controlled oscillator 82. At the end of the timer interval when the second counter has reached zero, the contents of the first counter are inspected. If the contents are negative, too many oscillations have occurred, and the feedback signal is reduced to reduce the oscillation frequency. Similarly, if the contents are positive, not enough oscillations have occurred, and the oscillation frequency is increased. If the contents are zero or close to zero, then the the output frequency of voltage controlled oscillator 82 is within the pull-range of the phase-locked loop, i.e. the initial state of the phase-locked loop is sufficiently close to the desired operating point. At this point, clock synchronization circuit 72 enters the tracking mode.

The advantages of the receiver system detailed above include a reduced part count. The novel clock synchronization circuit permits the use of a single voltage controlled oscillator for clocking the analog-to-digital converter. In conventional systems, it is necessary to use a bank of multiple voltage controlled crystal oscillators which are more accurate (and expensive) but have a sharply reduced range of oscillation. This advantage is gained through the use of digitally controlled feedback by the automatic frequency controller during the initial timing acquisition stage. An additional reduction in part count arises from the combination of the demodulation and decoding stages onto a single chip. The overall part count reduction leads to a significant simplification of board layout. Consequently a sharply increased reliability and hence increased utility are also obtained.

Numerous variations and modifications will become apparent to those skilled in the art once the above disclosure is fully appreciated. It is intended that the following claims be interpreted to embrace all such variations and modifications.

What is claimed is:

1. A DBS receiver system comprising:
   a tuner configured to receive a high frequency signal;
   an analog to digital converter operatively coupled to said tuner; and
   a receiver chip coupled to receive a digital signal from said analog to digital converter, said receiver chip comprising:
   a demodulator stage configured to receive said digital signal;
   a convolutional decoder stage operatively coupled to said demodulator stage; and
   a de-interleaver and block decoder stage operatively coupled to said convolutional decoder stage;
   wherein said demodulator stage includes:
   a matched filter configured to receive said digital signal;
   a module for clock synchronization, carrier synchronization and gain control, coupled to said matched filter; and
   a module for providing a first feedback signal coupled to said analog to digital converter to provide clock synchronization;
   wherein said first feedback signal module includes:
   a crystal oscillator configured to provide a high frequency clock reference signal;
   a loop filter coupled to receive an error signal and adjust a voltage signal which said loop filter provides;
   a voltage controlled oscillator coupled to receive said voltage signal and provide a clock signal with a clock rate substantially proportional to said voltage signal; and
   an automated frequency controller configured to receive a digital signal representing a desired clock rate, said automated frequency controller also being coupled to receive said high frequency clock reference signal and said clock signal, said automated frequency controller configured to provide said error signal indicating that said clock rate is higher than desired clock rate or lower than desired clock rate.

2. The DBS receiver system as recited in claim 1 wherein said tuner comprises:
   a frequency synthesizer, a multiplier, and a bandpass filter which function to convert said high frequency signal to an intermediate frequency signal;
   a gain control amplifier; and
   an I/Q down converter which converts said intermediate frequency signal into quadrature component baseband signals.

3. The DBS receiver system as recited in claim 1 wherein said demodulator stage further comprises a configurable decimation circuit coupled to said matched filter to receive a filtered digital signal at a rate of n symbols per second, said configurable decimation circuit serving to reduce said rate to k symbols per second where the ratio of k/n is a configurable parameter equal to ½, ⅓ or ¼.

4. The DBS receiver system as recited in claim 1 wherein said demodulator stage further comprises a module for providing a second feedback signal coupled to said tuner to provide carrier synchronization.

5. The DBS receiver system as recited in claims 4 wherein said tuner comprises:
   a frequency synthesizer, a multiplier, and a bandpass filter which function to convert said high frequency signal to an intermediate frequency signal;
   a gain control amplifier; and
   an I/Q down converter which converts said intermediate frequency signal into quadrature component baseband signals; and
wherein said second feedback signal module comprises a phase error detector and a loop filter which serve to provide a signal that drives a frequency error in said I/Q down converter to substantially zero.

6. The DBS receiver system as recited in claim 1 wherein said demodulator stage further comprises a module for providing a third feedback signal coupled to said tuner to provide gain control.

7. The DBS receiver system as recited in claim 1 wherein said convolutional decoder stage comprises:
   a Viterbi decoder configured to receive a convolutional encoded digital signal and provide a convolutional decoded digital signal;
   a convolutional encoder coupled to said Viterbi decoder to receive said convolutional decoded signal and provide a re-encoded digital signal;
   a comparator configured to receive said convolutional encoded signal and said re-encoded digital signal and thereafter provide a symbol error signal; and
   a Viterbi synchronization circuit coupled to receive said symbol error signal and thereafter adjust input timing to said Viterbi decoder.

8. The DBS receiver system as recited in claim 1 wherein said de-interleaver and block decoder stage comprises:
   a de-interleaver configured to receive an interleaved digital signal and provide a de-interleaved digital signal; and
   a block decoder coupled to receive said de-interleaved digital signal and provide a block decoded digital signal.

9. The DBS receiver system as recited in claim 1 wherein said automated frequency controller comprises:
   a first register containing a user-configurable timer interval;
   a first counter configured to receive the contents of said first register and thereafter decrement based on output of a crystal oscillator;
   a second register containing a number of cycles per timer interval; and
   a second counter configured to receive the contents of said second register and thereafter decrement based on output of said voltage control oscillator.

10. A DBS receiver system comprising:
    a tuner configured to receive a high frequency signal;
    an analog to digital converter operatively coupled to said tuner;
    a receiver chip coupled to receive a digital signal from said analog to digital converter, said receiver chip coupled to a crystal oscillator to receive a high frequency clock reference signal, said receiver chip also coupled to a loop filter to provide an error signal; and
    a voltage controlled oscillator coupled to receive a voltage signal from said loop filter and configured to provide a clock signal with a clock rate substantially proportional to said voltage signal;
wherein said receiver chip includes an automated frequency controller configured to receive a digital signal representing a desired clock rate, said automated frequency controller also being coupled to receive said high frequency clock reference signal and said clock signal, said automated frequency controller configured to provide said error signal indicating that said clock rate is higher than desired clock rate or lower than desired clock rate, said automated frequency controller comprising:
   a first counter configured to count for a configurable time interval based on output of said crystal oscillator; and
   a second counter configured to count a number of clock cycles in the clock signal during said time interval.

11. The DBS receiver system as recited in claim 10, wherein said receiver chip further comprises:
    a demodulator stage configured to receive said digital signal;
    a convolutional decoder stage operatively coupled to said demodulator stage; and
    a de-interleaver and block decoder stage operatively coupled to said convolutional decoder stage.

12. The DBS receiver system as recited in claim 11 wherein said demodulator stage comprises:
    a matched filter configured to receive said digital signal; and
    a module for clock synchronization, carrier synchronization and gain control, coupled to said matched filter.

13. The DBS receiver system as recited in claim 12 wherein said demodulator stage further comprises a configurable decimation circuit coupled to said matched filter to receive a filtered digital signal at a rate of n symbols per second, said configurable decimation circuit serving to reduce said rate to k symbols per second where the ratio of k/n is a configurable parameter equal to ½, ⅓ or ¼.

14. The DBS receiver system as recited in claim 11 wherein said convolutional decoder stage comprises:
    a Viterbi decoder configured to receive a convolutional encoded digital signal and provide a convolutional decoded digital signal;
    a convolutional encoder coupled to said Viterbi decoder to receive said convolutional decoded signal and provide a re-encoded digital signal;
    a comparator configured to receive said convolutional encoded signal and said re-encoded digital signal and thereafter provide a symbol error signal; and
    a Viterbi synchronization circuit coupled to receive said symbol error signal and thereafter adjust input timing to said Viterbi decoder.

15. The DBS receiver system as recited in claim 11 wherein said de-interleaver and block decoder stage comprises:
    a de-interleaver configured to receive an interleaved digital signal and provide a de-interleaved digital signal; and
    a block decoder coupled to receive said de-interleaved digital signal and provide a block decoded digital signal.

\* \* \* \* \*